United States Patent
Tran et al.

(10) Patent No.: US 10,832,084 B2
(45) Date of Patent: Nov. 10, 2020

(54) DENSE THREE-DIMENSIONAL CORRESPONDENCE ESTIMATION WITH MULTI-LEVEL METRIC LEARNING AND HIERARCHICAL MATCHING

(71) Applicant: NEC Laboratories America, Inc., Princeton, NJ (US)

(72) Inventors: Quoc-Huy Tran, Santa Clara, CA (US); Mohammed E. Fathy Salem, Hyattsville, MD (US); Muhammad Zeeshan Zia, San Jose, CA (US); Paul Vernaza, Sunnyvale, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/526,306

(22) Filed: Jul. 30, 2019

(65) Prior Publication Data

US 2020/0058156 A1 Feb. 20, 2020

Related U.S. Application Data

(60) Provisional application No. 62/719,154, filed on Aug. 17, 2018.

(51) Int. Cl.
*G06K 9/62* (2006.01)
*G06T 17/00* (2006.01)
*G06T 19/00* (2011.01)

(52) U.S. Cl.
CPC ......... *G06K 9/6211* (2013.01); *G06K 9/6232* (2013.01); *G06T 17/00* (2013.01); *G06T 19/006* (2013.01)

(58) Field of Classification Search
CPC ......... G06T 15/08; G06T 15/10; G06T 17/00; G06K 9/726; G06K 9/6211; G06K 9/6212; G06K 9/6232; G06N 3/0418; G06N 3/08
See application file for complete search history.

(56) References Cited

U.S. PATENT DOCUMENTS

2017/0219336 A1 8/2017 Kurtz et al.
2018/0268256 A1* 9/2018 Di Febbo ............. G06K 9/6211
(Continued)

OTHER PUBLICATIONS

Chopra, Sumit, Raia Hadsell, and Yann LeCun. "Learning a similarity metric discriminatively, with application to face verification." 2005 IEEE Computer Society Conference on Computer Vision and Pattern Recognition (CVPR'05). vol. 1. IEEE, 2005. (Year: 2005).*

(Continued)

*Primary Examiner* — Daniel F Hajnik
(74) *Attorney, Agent, or Firm* — Joseph Kolodka

(57) ABSTRACT

A method for estimating dense 3D geometric correspondences between two input point clouds by employing a 3D convolutional neural network (CNN) architecture is presented. The method includes, during a training phase, transforming the two input point clouds into truncated distance function voxel grid representations, feeding the truncated distance function voxel grid representations into individual feature extraction layers with tied weights, extracting low-level features from a first feature extraction layer, extracting high-level features from a second feature extraction layer, normalizing the extracted low-level features and high-level features, and applying deep supervision of multiple contrastive losses and multiple hard negative mining modules at the first and second feature extraction layers. The method further includes, during a testing phase, employing the high-level features capturing high-level semantic information to obtain coarse matching locations, and refining the coarse (Continued)

matching locations with the low-level features to capture low-level geometric information for estimating precise matching locations.

20 Claims, 8 Drawing Sheets

(56) References Cited

U.S. PATENT DOCUMENTS

2019/0087964 A1* 3/2019 Chen ................ G06N 7/005
2019/0279382 A1* 9/2019 Jiang ................ G06K 9/629

OTHER PUBLICATIONS

Qi, Charles Ruizhongtai, et al. "Pointnet++: Deep hierarchical feature learning on point sets in a metric space." Advances in neural information processing systems. 2017. (Year: 2017).*

Maturana, Daniel, and Sebastian Scherer. "Voxnet: A 3d convolutional neural network for real-time object recognition." 2015 IEEE/RSJ International Conference on Intelligent Robots and Systems (IROS). IEEE, 2015. (Year: 2015).*

Deng et al., "PPFNet: Global Context Aware Local Features for Robust 3D Point Matching", Proceedings of the IEEE Conference on Computer Vision and Pattern Recognition. Jun. 18-22, 2018. pp. 195-205.

Fathy et al., "Hierarchical Metric Learning and Matching for 2D and 3D Geometric Correspondences", Proceedings of the European Conference on Computer Vision. Sep. 8-14, 2018. pp. 803-819.

Georgakis et al., "End-to-end learning of keypoint detector and descriptor for pose invariant 3D matching", Proceedings of the IEEE Conference on Computer Vision and Pattern Recognition. Jun. 18-22, 2018. pp. 1965-1973.

Yew et al., "3DFeat-Net: Weakly Supervised Local 3D Features for Point Cloud Registration", Proceedings of the European Conference on Computer Vision (ECCV) 2018. Sep. 8-14, 2018. pp. 607-623.

Zeng et al., "3DMatch: Learning Local Geometric Descriptors from RGB-D Reconstructions", Proceedings of the IEEE Conference on Computer Vision and Pattern Recognition 2017. Jul. 21-26, 2017. pp. 1802-1811.

Mohammed E. Fathy et al "Hierarchical Metric Learning and Matching for 2D and 3D Geometric Correspondences", arxiv: 1803.07231, Aug. 2, 2018 (https://arxiv.org/pdf/1803.07231.pdf) see pp. 3-11, figures 1-2.

* cited by examiner

US 10,832,084 B2

DENSE THREE-DIMENSIONAL CORRESPONDENCE ESTIMATION WITH MULTI-LEVEL METRIC LEARNING AND HIERARCHICAL MATCHING

RELATED APPLICATION INFORMATION

This application claims priority to Provisional Application No. 62/719,154, filed on Aug. 17, 2018, the contents of which are incorporated herein by reference in their entirety.

BACKGROUND

Technical Field

The present invention relates to deep learning architectures capable of reasoning about three-dimensional (3D) geometric data such as point clouds and, more particularly, to dense 3D correspondence estimation with multi-level metric learning and hierarchical matching.

Description of the Related Art

Various computer vision tasks utilize three-dimensional (3D) correspondence estimation between point clouds to determine elements or objects in an environment, such as sensor location or object location. However, performing these tasks with hand-crafted descriptors does not match the performance of task-specific learned descriptors. Moreover, shallow feature extraction and deep feature extraction in 3D convolutional neural networks (CNNs) have trade-offs in performance. For example, a shallow feature extraction yields low-level, geometric features which are sensitive to local structures in the point clouds and are good for high precision tasks. Meanwhile, deep feature extraction yields high-level, semantic features which are robust to appearance changes in the point clouds, leading to high recall.

SUMMARY

A computer-implemented method for estimating dense three-dimensional (3D) geometric correspondences between two input point clouds by employing a 3D convolutional neural network (CNN) architecture is presented. The method includes, during a training phase, transforming the two input point clouds into truncated distance function voxel grid representations, feeding the truncated distance function voxel grid representations into individual feature extraction layers with tied weights, extracting low-level features from a first feature extraction layer, extracting high-level features from a second feature extraction layer, normalizing the extracted low-level features and high-level features to obtain unit vector features, and applying deep supervision of multiple contrastive losses and multiple hard negative mining modules at the first and second feature extraction layers. The method further includes, during a testing phase, employing the high-level features capturing high-level semantic information to obtain coarse matching locations; and refining the coarse matching locations with the low-level features to capture low-level geometric information for estimating precise matching locations.

A non-transitory computer-readable storage medium comprising a computer-readable program is presented for estimating dense three-dimensional (3D) geometric correspondences between two input point clouds by employing a 3D convolutional neural network (CNN) architecture, wherein the computer-readable program when executed on a computer causes the computer to perform the steps of, during a training phase, transforming the two input point clouds into truncated distance function voxel grid representations, feeding the truncated distance function voxel grid representations into individual feature extraction layers with tied weights, extracting low-level features from a first feature extraction layer, extracting high-level features from a second feature extraction layer, normalizing the extracted low-level features and high-level features to obtain unit vector features, and applying deep supervision of multiple contrastive losses and multiple hard negative mining modules at the first and second feature extraction layers. Further, the computer-readable program when executed on a computer causes the computer to perform the steps of, during a testing phase, employing the high-level features capturing high-level semantic information to obtain coarse matching locations; and refining the coarse matching locations with the low-level features to capture low-level geometric information for estimating precise matching locations.

A system for estimating dense three-dimensional (3D) geometric correspondences between two input point clouds by employing a 3D convolutional neural network (CNN) architecture is presented. The system includes a training module for training by transforming the two input point clouds into truncated distance function voxel grid representations, feeding the truncated distance function voxel grid representations into individual feature extraction layers with tied weights, extracting low-level features from a first feature extraction layer, extracting high-level features from a second feature extraction layer, normalizing the extracted low-level features and high-level features to obtain unit vector features, and applying deep supervision of multiple contrastive losses and multiple hard negative mining modules at the first and second feature extraction layers. The system further includes a testing module for testing by employing the high-level features capturing high-level semantic information to obtain coarse matching locations and refining the coarse matching locations with the low-level features to capture low-level geometric information for estimating precise matching locations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention implement a three-dimensional (3D) convolutional neural network (CNN) architecture for extracting dense descriptors, along with a novel hierarchical matching strategy within the 3D CNN activation maps for estimating dense correspondences.

The exemplary embodiments of the present invention further implement a 3D CNN architecture for dense descriptor learning. The exemplary embodiments apply deep supervision of multiple contrastive losses to multiple layers of the 3D CNN for more effective descriptor learning. Moreover, a hierarchical matching strategy is employed within the 3D CNN activation maps for fusing both high-level semantic features and low-level geometric features, which leads to more accurate correspondence estimation and higher accuracy for other geometric matching tasks such as point cloud registration.

Figure 1:
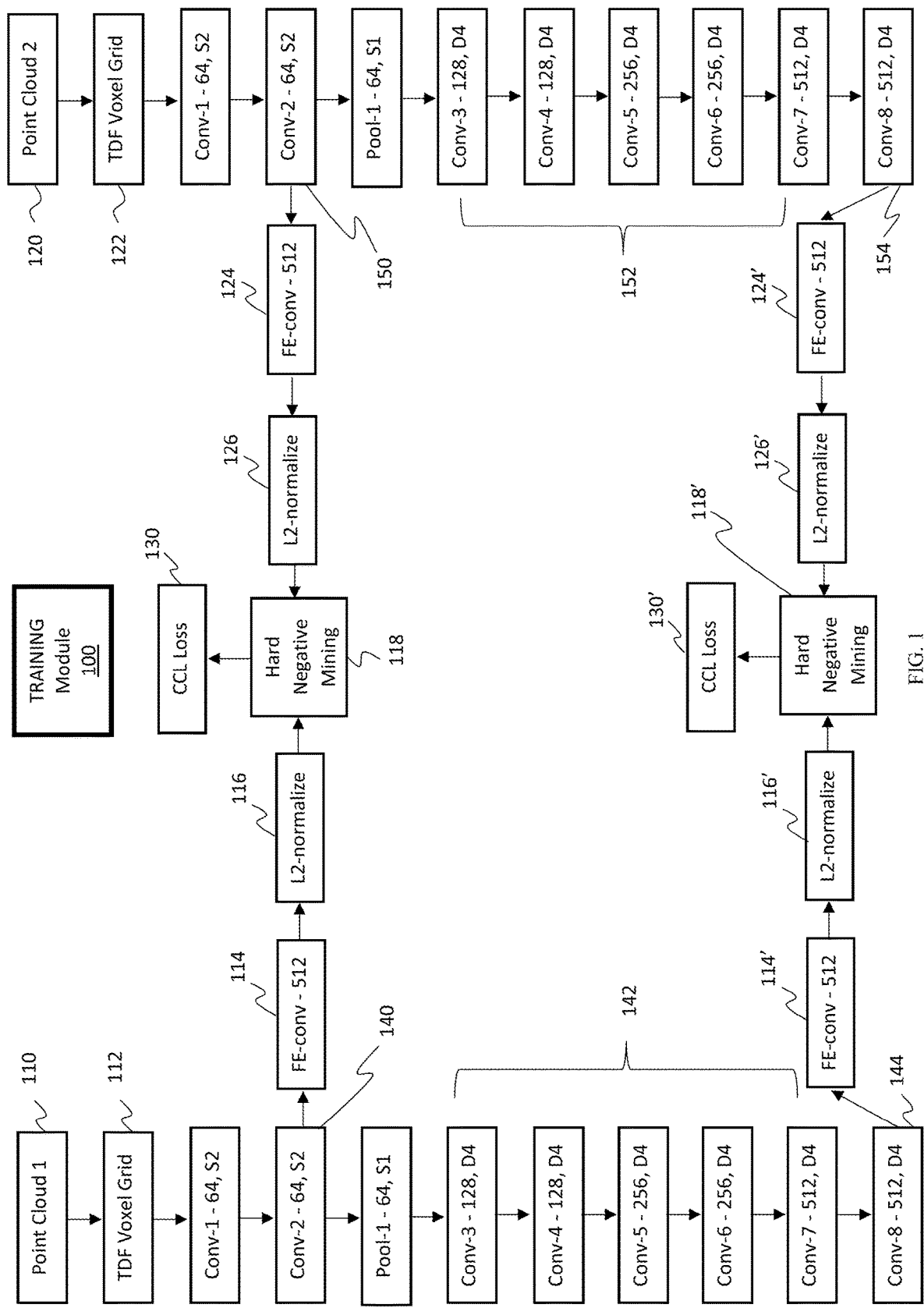
FIG. 1 is a block/flow diagram of deep supervision of multiple contrastive losses on multiple layers of a three-dimensional (3D) convolutional neural network (CNN) during a training phase, in accordance with embodiments of the present invention.

FIG. 1 is a block/flow diagram of deep supervision of multiple contrastive losses on multiple layers of a three-dimensional (3D) convolutional neural network (CNN) during a training phase, in accordance with embodiments of the present invention.

In the training module 100, two input point clouds 110, 120 are first transformed into truncated distance function (TDF) voxel grid representations 112, 122. The TDF voxel grids 112, 122 are then passed through individual feature extraction modules 114, 114', 124, 124' with tied weights to extract low-level features and high-level features at conv-2 layer (140, 150) and conv-8 layer (144, 154), respectively. The features are then normalized using L2 normalization 116, 116', 126, 126' to obtain unit feature vectors. The exemplary embodiments apply deep supervision of multiple contrastive losses 130, 130' with multiple hard negative mining modules 118, 118' at conv-2 and conv-8 layers (140, 150) and (144, 154), respectively. In FIG. 1, the exemplary embodiments employ the two best performing feature layers, namely conv-2 (140, 150) and conv-8 layers (144, 154). In particular, conv-2 features yield best precision, while conv-8 features produce best recall. Adding intermediate supervision to intermediate layers such as conv-3, conv-4, conv-5, (142, 152) etc., leads to marginal gains in performance.

Regarding point clouds 110, 120, 3D point clouds are used in various computer vision applications. 3D point clouds are sets of data points in a 3D coordinate system representing an external surface of an object. 3D point clouds may be obtained by a 3D capturing device, such as a 3D scanner. A large number of points are measured on the surface of an object, and the obtained point cloud may be stored in a file.

Various sensing methods for obtaining 3D point clouds have been developed. For example, in Structure-From-Motion (SFM), three-dimensional structures are estimated from two-dimensional images, where the observer and/or the objects to be observed move in relation to each other. In Light Detection And Ranging (LiDAR) method, distances are measured by illuminating an object with a laser beam and analyzing the reflected light. The resulting data is stored as point clouds.

Figure 2:
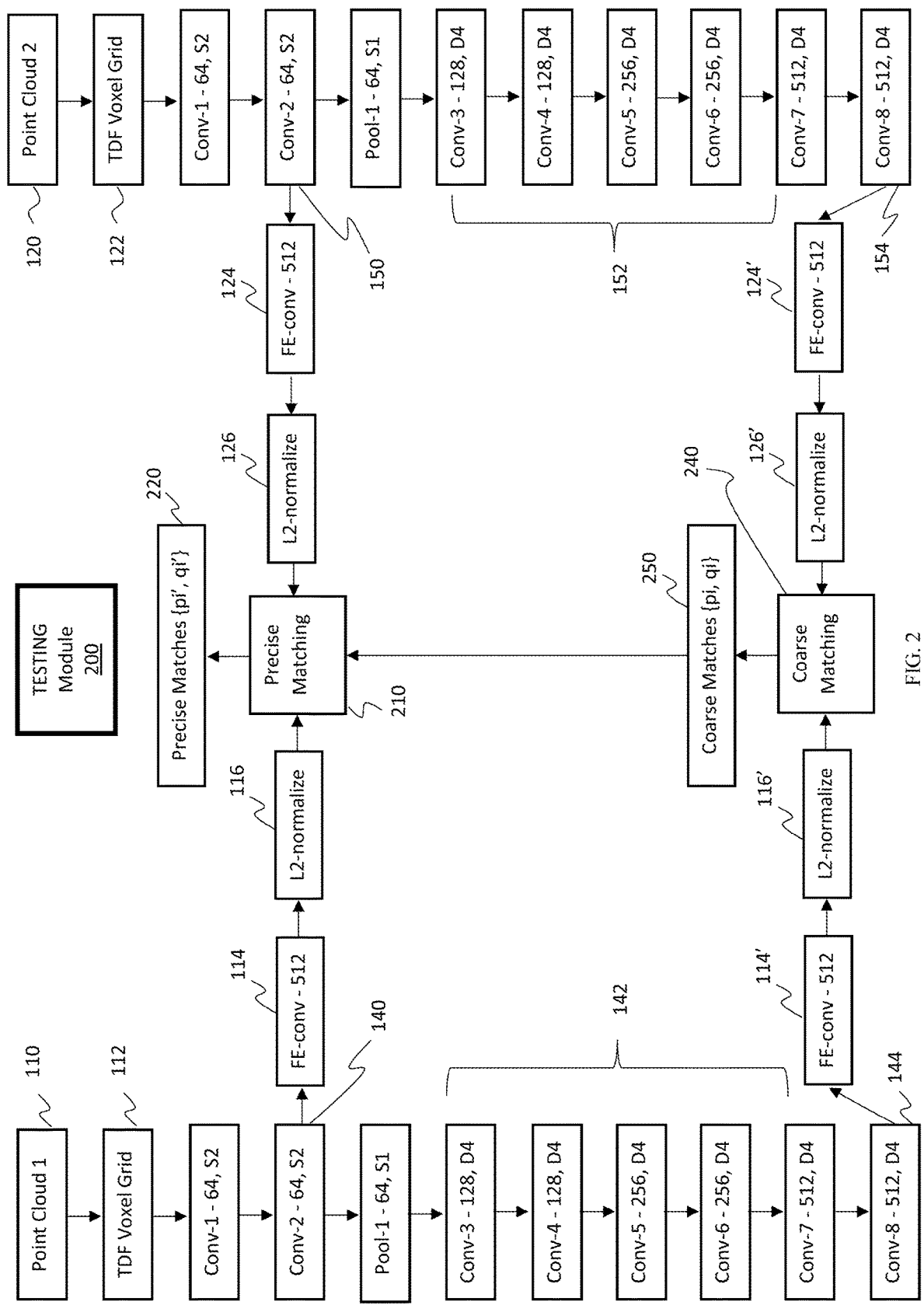
FIG. 2 is a block/flow diagram of a hierarchical matching strategy within the 3D CNN activation maps for fusing both high-level semantic features and low-level geometric features during a testing phase, in accordance with embodiments of the present invention.

FIG. 2 is a block/flow diagram of a hierarchical matching strategy within the 3D CNN activation maps for fusing both high-level semantic features and low-level geometric features during a testing phase, in accordance with embodiments of the present invention.

In the testing module 200, the exemplary embodiments first use high-level features (conv-8 features) (144, 154) which capture high-level semantic information, e.g., object class and object pose, to obtain coarse matching locations 240, 250. The coarse matches 250 can be designated as $\{p_i, q_i\}$. The coarse matching locations 240, 250 are then refined using low-level features (conv-2 features) (140, 150), which capture low-level geometric information, e.g., color and edge, and hence are good for estimating precise matching locations 210, 220. The precise matches 220 can be designated as $\{p_i', q_i'\}$. In FIG. 2, the exemplary embodiments employ the two best performing feature layers, namely conv-2 and conv-8 layers. In particular, conv-2 features yield best precision, while conv-8 features produce best recall. Adding intermediate matching to intermediate layers such as conv-3, conv-4, conv-5, etc., (142, 152) leads to marginal gains in performance.

Figure 3:
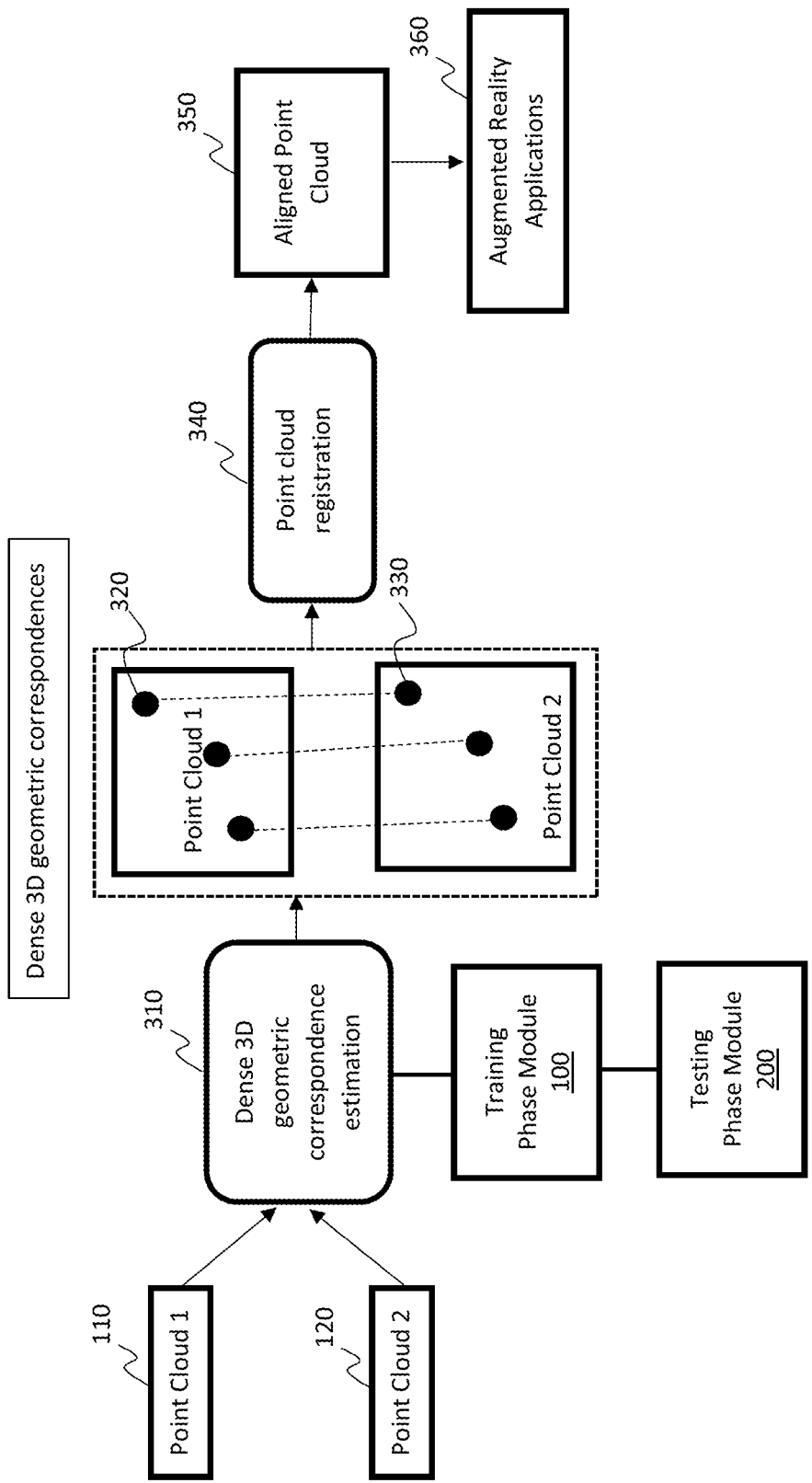
FIG. 3 is a block/flow diagram of an example dense 3D geometric correspondence estimation method producing dense 3D geometric correspondences, in accordance with embodiments of the present invention.

FIG. 3 is a block/flow diagram of an example dense 3D geometric correspondence estimation method producing dense 3D geometric correspondences, in accordance with embodiments of the present invention.

The application of the dense 3D geometric correspondence estimation method to point cloud registration is shown in FIG. 3. Two input point clouds 110, 120 are first passed to the dense 3D geometric correspondence estimation method 310 (including a training module 100 and a testing module 200), which produces dense 3D geometric correspondences 320, 330. These dense 3D geometric correspondences 320, 330 can then be fed to the point cloud registration module 340, which computes a rigid transformation (e.g., 3D rotation and 3D translation) or a non-rigid transformation (e.g., a 3D vector field), which is used to align the input point clouds 110, 120. The output is the aligned point cloud 350, which provides larger view of the scene and is used in applications such as augmented reality applications 360.

Figure 4:
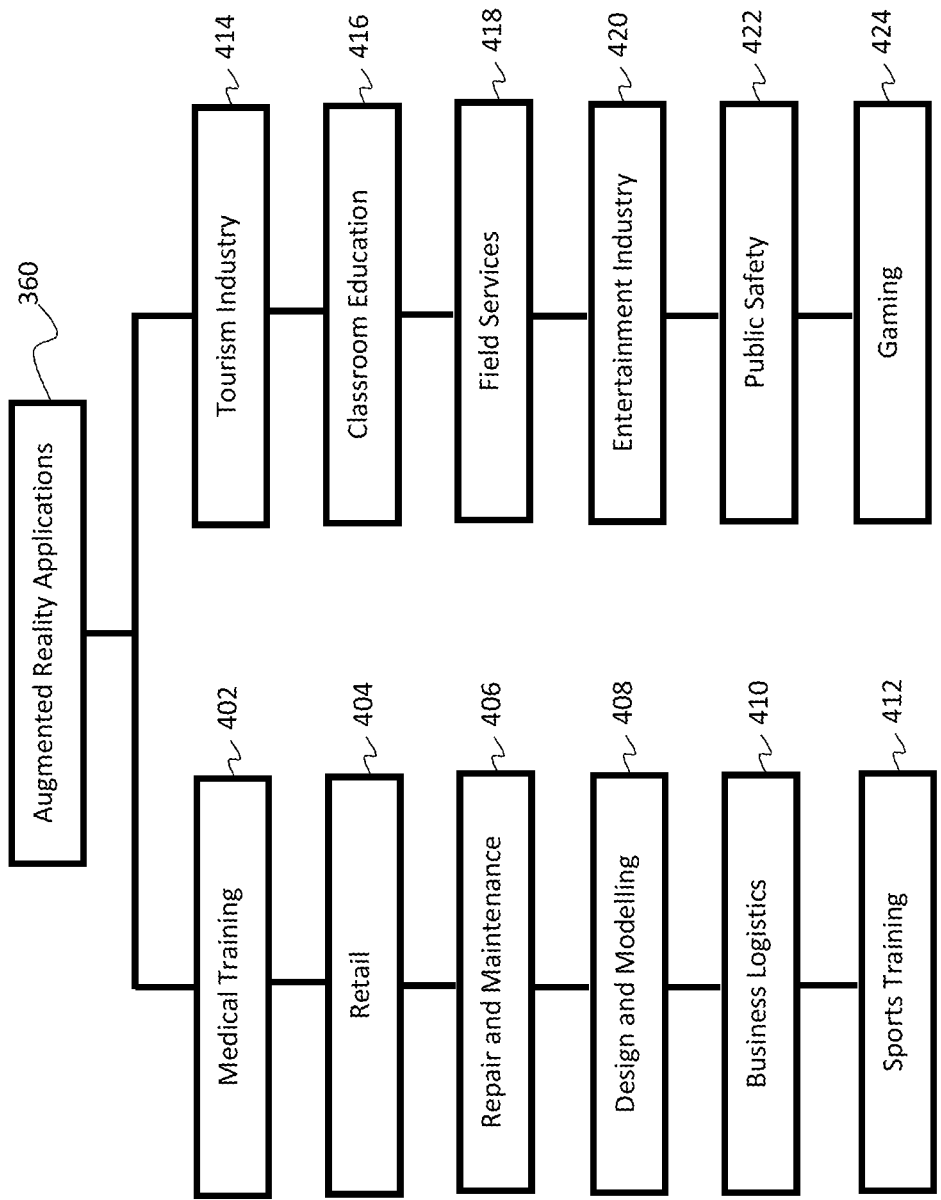
FIG. 4 is a block/flow diagram of example augmented reality applications for employing the aligned point cloud output, in accordance with embodiments of the present invention.

FIG. 4 is a block/flow diagram of example augmented reality applications for employing the aligned point cloud output, in accordance with embodiments of the present invention.

The exemplary embodiments of the present invention can be employed with any augmented reality applications 360.

Some example augmented reality applications include medical training 402, retail 404, repair and maintenance 406, design and modelling 408, business logistics 410, sports training 412, tourism industry 414, classroom education 416, field services 418, entertainment industry 420, public safety 422, and gaming 424 to name a few.

For example, regarding medical training 402, from operating magnetic resonance imaging (MRI) equipment to performing complex surgeries, AR tech holds the potential to boost the depth and effectiveness of medical training in many areas.

Regarding retail 404, e.g., in today's physical retail environment, shoppers are using their smartphones more than ever to compare prices or look up additional information on products they are browsing.

Regarding repair and maintenance 406, e.g., one of the biggest industrial use cases of AR is for repair and maintenance of complex equipment. Whether a car motor or an MRI machine, repair and maintenance staff are beginning to use AR headsets and glasses while they perform their jobs to provide them with useful information on the spot, suggest potential fixes, and point out potential trouble areas.

Figure 5:
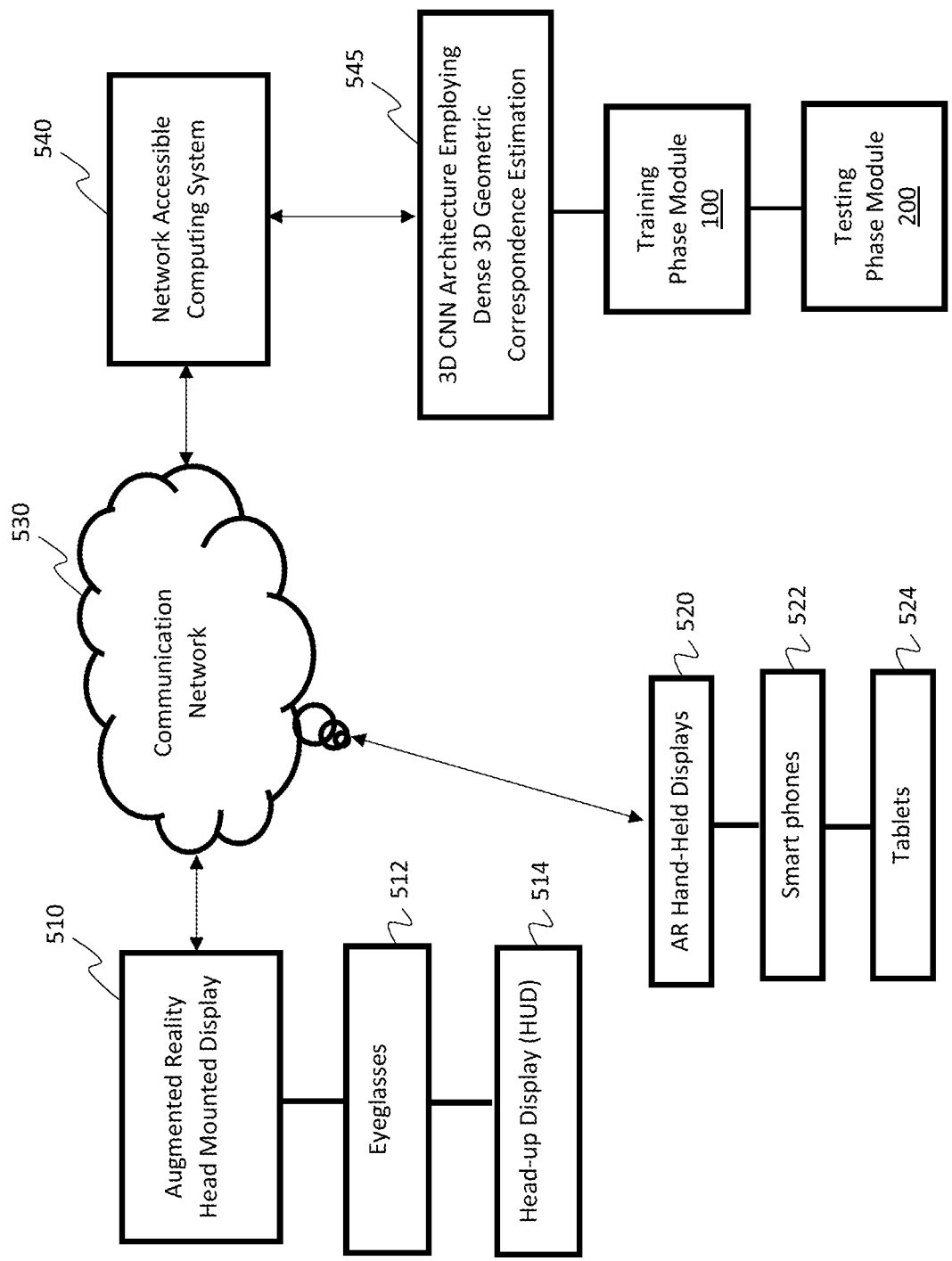
FIG. 5 is a block/flow diagram of an example communication network communicating with augmented reality devices and a computing system employing the dense 3D geometric correspondence estimation method, in accordance with embodiments of the present invention.

FIG. 5 is a block/flow diagram of an example communication network communicating with augmented reality devices and a computing system employing the dense 3D geometric correspondence estimation method, in accordance with embodiments of the present invention.

Augmented reality (AR) head mounted displays 510 can communicate over a communication network 530 with a network accessible computing system 540. The network accessible computing system 540 can use the 3D CNN architecture 545 employing dense 3D geometric correspondence estimation (including a training module 100 and a testing module 200).

The AR head mounted displays 510 can include, e.g., eyeglasses 512 and/or head-up displays (HUDs) 514. Regarding AR eyeglasses 512, AR displays can be rendered on devices resembling eyeglasses. Versions include eyewear that employs cameras to intercept the real world view and re-display its augmented view through the eyepieces and devices in which the AR imagery is projected through or reflected off the surfaces of the eyewear lens pieces. A head-up display (HUD) 514, on the other hand, is a transparent display that presents data without requiring users to look away from their usual viewpoints. Near-eye augmented reality devices can be used as portable head-up displays as they can show data, information, and images while the user views the real world.

Additionally, augmented reality (AR) hand-held displays 520 can communicate over a communication network 530 with a network accessible computing system 540. The network accessible computing system 540 can use the 3D CNN architecture 545 employing dense 3D geometric correspondence estimation (including a training module 100 and a testing module 200).

The AR hand-held displays 520 can include, e.g., smartphones 522 and/or tablets 524. A hand-held display employs a small display that fits in a user's hand. All hand-held AR solutions opt for video see-through. Initially hand-held AR employed fiducial markers, and later global positioning system (GPS) units and micro-electromechanical system (MEMS) sensors such as digital compasses and six degrees of freedom accelerometer—gyroscope. Recently, simultaneous localization and mapping (SLAM) marker-less trackers such as PTAM (parallel tracking and mapping) are starting to come into use. Hand-held display AR promises to be the first commercial success for AR technologies. The two main advantages of hand-held AR are the portable nature of hand-held devices and the ubiquitous nature of camera phones.

Figure 6:
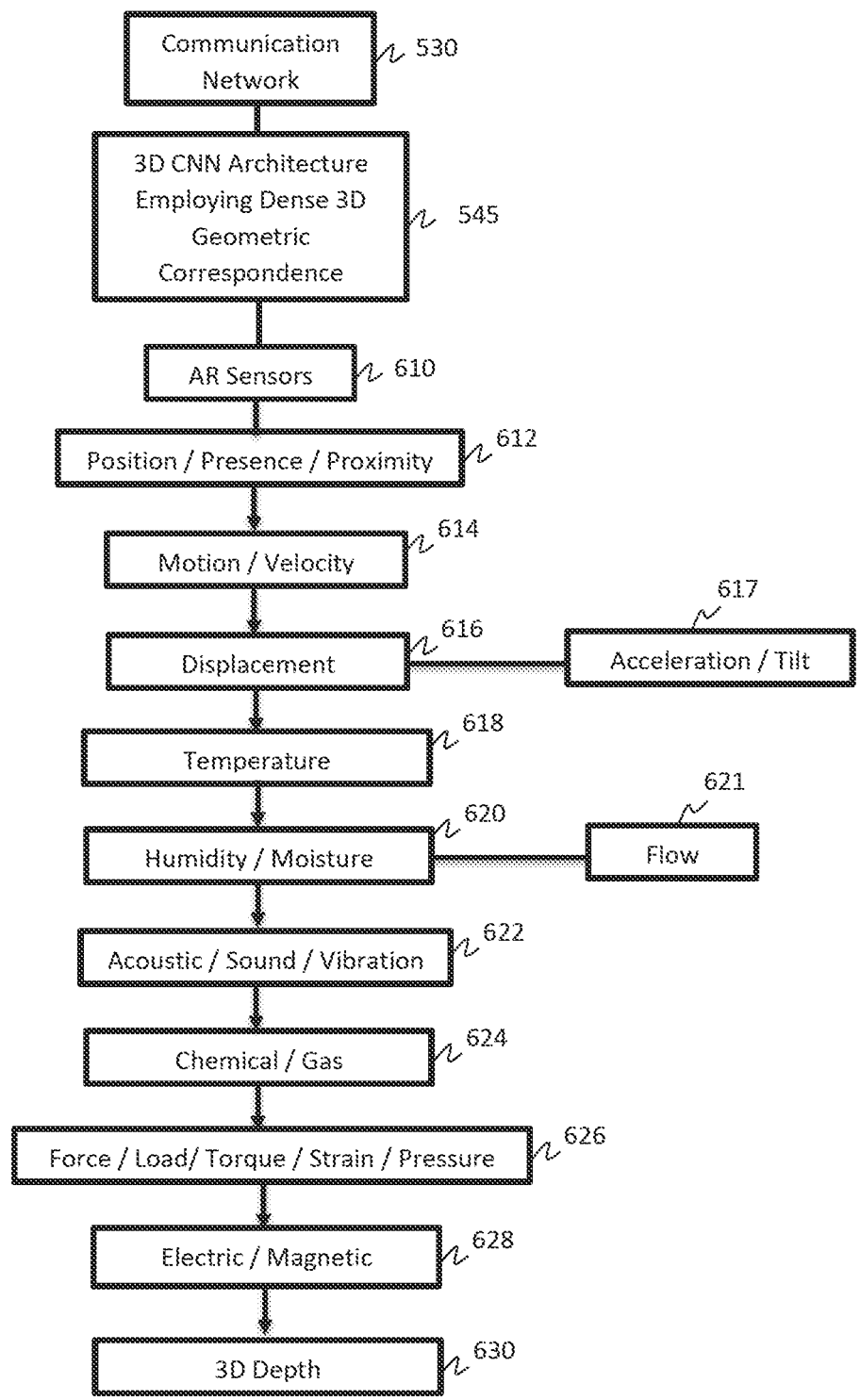
FIG. 6 is a block/flow diagram of example augmented reality sensors employed by the augmented reality devices of FIG. 5, in accordance with embodiments of the present invention.

FIG. 6 is a block/flow diagram of example augmented reality sensors employed by the augmented reality devices of FIG. 5, in accordance with embodiments of the present invention.

The communication networks 530 can communicate with, e.g., wearable, implantable, or ingestible electronic devices and augmented reality (AR) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The AR sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The communication networks 530 described herein can communicate with any type of electronic devices for any type of use or application or operation.

Augmented reality loses its distinction without sensors. AR sensors act as defining instruments which transform AR from a standard passive network of devices into an active system capable of real-world integration.

The AR sensors 610 can be connected via the communication networks 530 to transmit information/data, continuously and in real-time. Exemplary AR sensors 610 can include, but are not limited to, position/presence/proximity sensors 612, motion/velocity sensors 614, displacement sensors 616, such as acceleration/tilt sensors 617, temperature sensors 618, humidity/moisture sensors 620, as well as flow sensors 621, acoustic/sound/vibration sensors 622, chemical/gas sensors 624, force or load or torque or strain or pressure sensors 626, electric/magnetic sensors 628, and/or 3D depth sensors 630. One skilled in the art can contemplate using any combination of such sensors to collect data/information and input into the modules 100, 200 of the communication networks 530 for further processing. One skilled in the art can contemplate using other types of AR sensors, such as, but not limited to, magnetometers, gyroscopes, image sensors, light sensors, radio frequency identification (RFID) sensors, and/or micro flow sensors. AR sensors can also include energy modules, power management modules, RF modules, and sensing modules. RF modules manage communications through their signal processing, WiFi, ZigBee®, Bluetooth®, radio transceiver, duplexer, etc.

Moreover data collection software can be used to manage sensing, measurements, light data filtering, light data security, and aggregation of data. Data collection software uses certain protocols to aid AR sensors in connecting with real-time, machine-to-machine networks. Then the data collection software collects data from multiple devices and distributes it in accordance with settings. Data collection software also works in reverse by distributing data over devices. The system can eventually transmit all collected data to, e.g., a central server.

Figure 7:
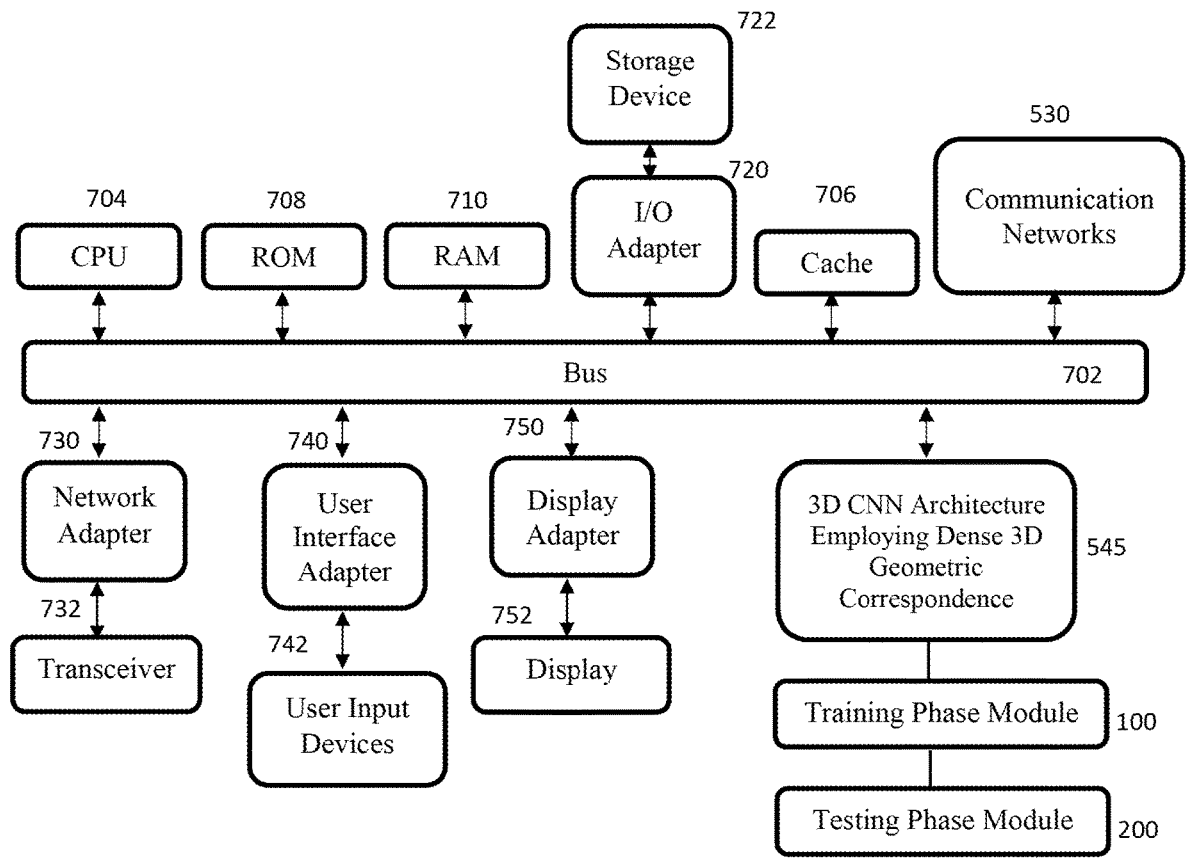
FIG. 7 is block/flow diagram of an exemplary processing system for estimating dense 3D geometric correspondences between two input point clouds by employing a 3D CNN architecture, in accordance with embodiments of the present invention.

FIG. 7 is block/flow diagram of an exemplary processing system for estimating dense three-dimensional (3D) geometric correspondences between two input point clouds by employing a 3D CNN architecture, in accordance with embodiments of the present invention.

The processing system includes at least one processor or processor device (CPU) 704 operatively coupled to other components via a system bus 702. A cache 706, a Read Only Memory (ROM) 708, a Random Access Memory (RAM) 710, an input/output (I/O) adapter 720, a network adapter 730, a user interface adapter 740, and a display adapter 750, are operatively coupled to the system bus 702. Communication networks 530 can be connected to bus 702. The communication networks 530 can employ a 3D CNN architecture with dense 3D geometric correspondence 545 including a training module 100 and a testing module 200.

A storage device 722 is operatively coupled to system bus 702 by the I/O adapter 720. The storage device 722 can be any of a disk storage device (e.g., a magnetic or optical disk storage device), a solid state magnetic device, and so forth.

A transceiver 732 is operatively coupled to system bus 702 by network adapter 730.

User input devices 742 are operatively coupled to system bus 702 by user interface adapter 740. The user input devices 742 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 742 can be the same type of user input device or different types of user input devices. The user input devices 742 are used to input and output information to and from the processing system.

A display device 752 is operatively coupled to system bus 702 by display adapter 750.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
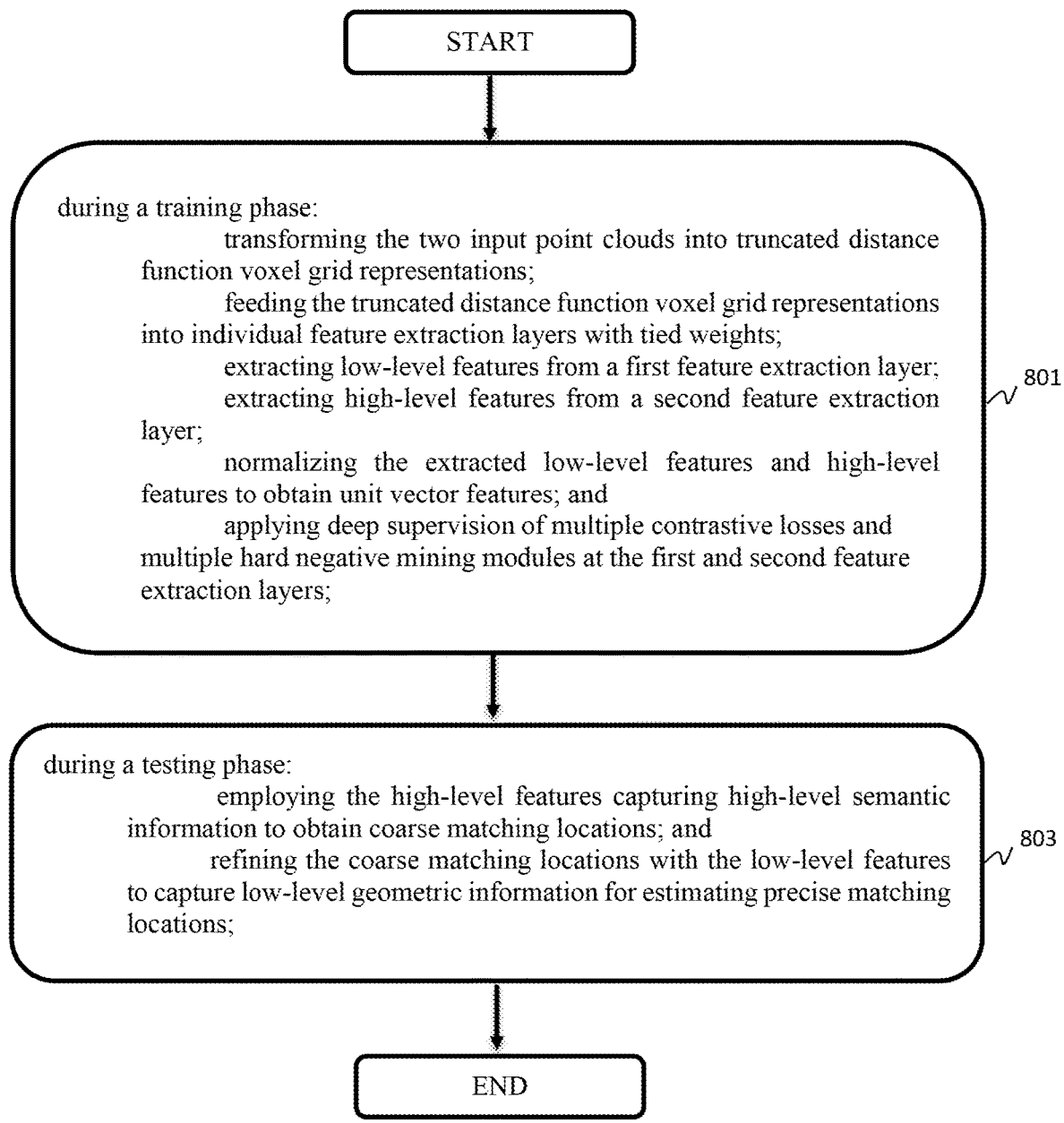
FIG. 8 is a block/flow diagram of an exemplary method for estimating dense 3D geometric correspondences between two input point clouds by employing a 3D CNN architecture, in accordance with embodiments of the present invention.

FIG. 8 is a block/flow diagram of an exemplary method for estimating dense three-dimensional (3D) geometric correspondences between two input point clouds by employing a 3D CNN architecture, in accordance with embodiments of the present invention.

At block 801, during a training phase, the following steps can be performed: transforming the two input point clouds into truncated distance function voxel grid representations, feeding the truncated distance function voxel grid representations into individual feature extraction layers with tied weights, extracting low-level features from a first feature extraction layer, extracting high-level features from a second feature extraction layer, normalizing the extracted low-level features and high-level features to obtain unit vector features, and applying deep supervision of multiple contrastive losses and multiple hard negative mining modules at the first and second feature extraction layers.

At block 803, during a testing phase, the following steps can be performed: employing the high-level features capturing high-level semantic information to obtain coarse matching locations and refining the coarse matching locations with the low-level features to capture low-level geometric information for estimating precise matching locations.

In summary, deep supervision of multiple contrastive losses on multiple layers of the 3D CNN is illustrated in FIG. 1. Additionally, a hierarchical matching strategy within the 3D CNN activation maps for fusing both high-level semantic features and low-level geometric features is illustrated in FIG. 2 and point cloud registration using dense 3D geometric correspondence estimation is illustrated in FIG. 3.

The deep supervision of multiple contrastive losses on multiple layers of the 3D CNN as illustrated in FIG. 1 allows for more effective descriptor learning, as opposed to previous approaches which have supervision on the deepest layer only. The hierarchical matching strategy within the 3D CNN activation maps for fusing both high-level semantic features and low-level geometric features as illustrated in FIG. 2 leads to more accurate correspondence estimation, as compared to previous approaches which rely purely on high-level semantic features. Further, dense 3D geometric correspondence estimation as shown in FIGS. 1 and 2 enables the point cloud registration to be done more accurately as illustrated in FIG. 3.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for estimating dense three-dimensional (3D) geometric correspondences between two input point clouds by employing a 3D convolutional neural network (CNN) architecture, the method comprising:
   during a training phase:
      transforming the two input point clouds into truncated distance function voxel grid representations;

feeding the truncated distance function voxel grid representations into individual feature extraction layers with tied weights;
extracting low-level features from a first feature extraction layer;
extracting high-level features from a second feature extraction layer;
normalizing the extracted low-level features and high-level features to obtain unit vector features; and
applying deep supervision of multiple contrastive losses and multiple hard negative mining modules at the first and second feature extraction layers; and
during a testing phase:
employing the high-level features capturing high-level semantic information to obtain coarse matching locations; and
refining the coarse matching locations with the low-level features to capture low-level geometric information for estimating precise matching locations.

2. The method of claim 1, further comprising applying deep supervision of multiple contrastive losses to multiple layers of 3D CNN architecture for descriptor learning.

3. The method of claim 1, further comprising employing a hierarchical matching strategy within activation maps of the 3D CNN architecture to fuse the high-level semantic information and the low-level geometric information.

4. The method of claim 3, wherein the high-level semantic information includes at least object class and object pose.

5. The method of claim 3, wherein the low-level geometric information includes at least color and edge data.

6. The method of claim 1, wherein the 3D geometric correspondences are fed into a point cloud registration device to compute either a rigid transformation or a non-rigid transformation.

7. The method of claim 6, wherein the point cloud registration device outputs an aligned point cloud providing a larger view of a scene.

8. A non-transitory computer-readable storage medium comprising a computer-readable program for estimating dense three-dimensional (3D) geometric correspondences between two input point clouds by employing a 3D convolutional neural network (CNN) architecture, wherein the computer-readable program when executed on a computer causes the computer to perform the steps of:
during a training phase:
transforming the two input point clouds into truncated distance function voxel grid representations;
feeding the truncated distance function voxel grid representations into individual feature extraction layers with tied weights;
extracting low-level features from a first feature extraction layer;
extracting high-level features from a second feature extraction layer;
normalizing the extracted low-level features and high-level features to obtain unit vector features; and
applying deep supervision of multiple contrastive losses and multiple hard negative mining modules at the first and second feature extraction layers; and
during a testing phase:
employing the high-level features capturing high-level semantic information to obtain coarse matching locations; and
refining the coarse matching locations with the low-level features to capture low-level geometric information for estimating precise matching locations.

9. The non-transitory computer-readable storage medium of claim 8, wherein deep supervision of multiple contrastive losses is applied to multiple layers of 3D CNN architecture for descriptor learning.

10. The non-transitory computer-readable storage medium of claim 8, wherein a hierarchical matching strategy is employed within activation maps of the 3D CNN architecture to fuse the high-level semantic information and the low-level geometric information.

11. The non-transitory computer-readable storage medium of claim 10, wherein the high-level semantic information includes at least object class and object pose.

12. The non-transitory computer-readable storage medium of claim 10, wherein the low-level geometric information includes at least color and edge data.

13. The non-transitory computer-readable storage medium of claim 8, wherein the 3D geometric correspondences are fed into a point cloud registration device to compute either a rigid transformation or a non-rigid transformation.

14. The non-transitory computer-readable storage medium of claim 13, wherein the point cloud registration device outputs an aligned point cloud providing a larger view of a scene.

15. A system for estimating dense three-dimensional (3D) geometric correspondences between two input point clouds by employing a 3D convolutional neural network (CNN) architecture, the system comprising:
a training module for training by:
transforming the two input point clouds into truncated distance function voxel grid representations;
feeding the truncated distance function voxel grid representations into individual feature extraction layers with tied weights;
extracting low-level features from a first feature extraction layer;
extracting high-level features from a second feature extraction layer;
normalizing the extracted low-level features and high-level features to obtain unit vector features; and
applying deep supervision of multiple contrastive losses and multiple hard negative mining modules at the first and second feature extraction layers; and
a testing module for testing by:
employing the high-level features capturing high-level semantic information to obtain coarse matching locations; and
refining the coarse matching locations with the low-level features to capture low-level geometric information for estimating precise matching locations.

16. The system of claim 15, wherein deep supervision of multiple contrastive losses is applied to multiple layers of 3D CNN architecture for descriptor learning.

17. The system of claim 15, wherein a hierarchical matching strategy is employed within activation maps of the 3D CNN architecture to fuse the high-level semantic information and the low-level geometric information.

18. The system of claim 17, wherein the high-level semantic information includes at least object class and object pose, and the low-level geometric information includes at least color and edge data.

19. The system of claim 15, wherein the 3D geometric correspondences are fed into a point cloud registration device to compute either a rigid transformation or a non-rigid transformation.

20. The system of claim 19, wherein the point cloud registration device outputs an aligned point cloud providing a larger view of a scene.

* * * * *